(12) United States Patent
Finn (10) Patent No.: US 12,079,976 B2
(45) Date of Patent: Sep. 3, 2024

(54) METHODS AND SYSTEMS FOR REDUCING DIMENSIONALITY IN A REDUCTION AND PREDICTION FRAMEWORK

(71) Applicant: Eigen Innovations Inc., Fredericton (CA)

(72) Inventor: Ryan Finn, Fredericton (CA)

(73) Assignee: EIGEN INNOVATIONS INC., Fredericton (CA)

( * ) Notice: Subject to any disclaimer, the term of this patent is extended or adjusted under 35 U.S.C. 154(b) by 883 days.

(21) Appl. No.: 17/169,359

(22) Filed: Feb. 5, 2021

(65) Prior Publication Data

US 2021/0241113 A1 Aug. 5, 2021

Related U.S. Application Data

(60) Provisional application No. 62/970,493, filed on Feb. 5, 2020.

(51) Int. Cl.
| | |
|---|---|
| *G06T 7/00* | (2017.01) |
| *G06F 18/21* | (2023.01) |
| *G06F 18/23213* | (2023.01) |
| *G06N 3/045* | (2023.01) |
| *G06N 3/082* | (2023.01) |
| *G06V 10/762* | (2022.01) |
| *G06V 10/764* | (2022.01) |

(Continued)

(52) U.S. Cl.
CPC .......... *G06T 7/0004* (2013.01); *G06F 18/217* (2023.01); *G06F 18/23213* (2023.01); *G06N 3/045* (2023.01); *G06N 3/082* (2013.01); *G06V 10/763* (2022.01); *G06V 10/764* (2022.01); *G06V 10/7715* (2022.01); *G06V 10/82* (2022.01); *G06T 2207/20081* (2013.01); *G06T 2207/20084* (2013.01); *G06T 2207/30108* (2013.01)

(58) Field of Classification Search
None
See application file for complete search history.

(56) References Cited

U.S. PATENT DOCUMENTS

| | | | |
|---|---|---|---|
| 2016/0132754 A1* | 5/2016 | Akhbardeh | G06V 20/52 382/103 |
| 2017/0286798 A1* | 10/2017 | Jiang | G06F 18/23213 |
| 2018/0130207 A1* | 5/2018 | Anderson | G06V 20/698 |

OTHER PUBLICATIONS

Zhou et al. A deep manifold learning approach for spatial-spectral classification with limited labeled training samples. Neurocomputing, 331. 2019.

(Continued)

*Primary Examiner* — Lennin R Rodriguezgonzalez
(74) *Attorney, Agent, or Firm* — David J. Greer; Smart & Biggar LP (57) ABSTRACT

Method and system that includes receiving an sensed data point from an industrial process; applying a mapping model to map the sensed data point to a respective embedding that has reduced dimensionality relative to the sensed data point; determining, based on a comparison of the respective embedding to prior embeddings, if the mapping model needs to be updated or not. When the mapping model needs to be updated, applying manifold learning to learn an updated set of model parameters for the mapping model. When the mapping model does not need to be updated, applying a classification model to the respective embedding to predict a classification for the sensed data point.

17 Claims, 7 Drawing Sheets

(51) Int. Cl.
    *G06V 10/77*     (2022.01)
    *G06V 10/82*     (2022.01)

(56) References Cited

OTHER PUBLICATIONS

R. Finn and R. Dubay, "Out-of-Sample mapping of a two-link robotic manipulator," in Proc. 12th IEEE Annu. Int. Syst. Conf. 2018.
H. Ohlsson, J. Roll, T. Glad, and L. Ljung, "Using manifold learning for non-linear system identification," IFAC Proc. Volumes, vol. 40, No. 12 2007.
A. Izenman, Modern Multivariate Statistical Techniques:Regression, Classification, andManifold Learning, 1st ed. Berlin, Germany: Springer 2013.
L. Ljung, "Perspectives on system identification," Annu. Rev. Controls, vol. 34, No. 1 2010.
E. Camacho and C. Bordons, Model Predictive Control, 2nd ed. Berlin, Germany: Springer 2007.
S. Zhang, R. Dubay, and M. Charest, "A principal component analysis model-based predictive controller for controlling part warpage in plastic injection molding," Expert Syst. Appl., Int. J., vol. 42, No. 6 2015.
Z. Zhang, J. Wang, and H. Zha, "Adaptive manifold learning," IEEE Trans. Pattern Anal. Mach. Intell., vol. 34, No. Feb. 2, 2012.
Y. Ma and Y. Fu, Manifold Learning Theory and Applications. Boca Raton, FL, USA: CRC Press 2011.
A. Bernstein, A. Kuleshov, and Y. Yanovich, "Manifold learning in regression tasks," in Proc. Int. Symp. Statist. Learn. Data Sci., vol. 9047 2015.
Y. Wang and L. Wu, "Beyond low-rank representations: Orthogonal clustering basis reconstruction with optimized graph structure for multi-view spectral clustering," Neural Netw., vol. 103 2018.
Y. Wang, L. Wu, X. Lin, and J. Gao, "Multiview spectral clustering via structured low-rank matrix factorization," IEEE Trans. Neural Netw. Learn. Syst., vol. 29, No. Oct. 10, 2018.
Y. Wang, X. Lin, L. Wu, W. Zhang, Q. Zhang, and X. Huang, "Robust subspace clustering for multi-view data by exploiting correlation consensus," IEEE Trans. Image Process., vol. 24, No. Nov. 11, 2015.
Y. Zhao et al., "Multi-view manifold learning with locality alignment," Pattern Recognit., vol. 78 2018.
C. Hou, C. Zhang, Y. I. Wu, and F. Nie, "Multiple view semi-supervised dimensionality reduction," Pattern Recognit., vol. 43, No. 3 2010.
Y. Han, F. Wu, D. Tao D, J. Shao, Y. Zhuang, and J. Jiang, "Sparse unsupervised dimensionality reduction for multiple view data," IEEE Trans. Circuits Syst. Video Technol., vol. 22, No. 10 2012.
Y. Luo et al., "Tensor canonical correlation analysis for multi-view dimension reduction," IEEE Trans. Knowl. Data Eng., vol. 27, No. Nov. 11, 2015.
Y. H. Yuan, Q. S. Sun, and H. W. Ge, "Fractional-order embedding canonical correlation analysis and its applications to multi-view dimensionality reduction and recognition," Pattern Recognit., vol. 47, No. 3 2014.
H. Ohlsson, J. Roll, and L. Ljung, "Manifold-Constrained regressors in system identification," in Proc. 47th IEEE Conf. Decis. Control 2008.
B. Boots and G. Gordon, "Two-Manifold problem with applications to non-linear system identification," in Proc. 29th Int. Conf. Mach. Learn 2012.
Bui, S. Zakharov, S. Albarqouni, S. Ilic, and N. Navab, "When regression meets manifold learning for object recognition and pose estimation," in Proc. 2018.
R. Coifman and S. Lafon, "Geometric harmonics: A novel tool for multiscale out-of-sample extension of empirical functions," Appl. Comput. Harmon. Anal., Sci. Direct, vol. 21 2006.
M. Pavan and M. Pelillo, "Efficient out-of-sample extension of dominant-set clusters," in Proc. 17th Int. Conf. Neural Inf. Process. Syst., vol. 17 2005.
C. Orsenigo and C. Vercellis, "Kernel ridge regression for out-of-sample mapping in supervised manifold learning," Expert Syst. Appl., vol. 39, No. 9 2012.
J. Tenenbaum, V. Silva, and J. Langford, "A global geometric framework for non-linear dimensionality reduction," Science, vol. 290 2000.
S. Roweis and L. Saul, "Non-linear dimensionality reduction by local linear embedding," Science, vol. 290 2000.
Pedregosa et al., "Scikit-learn: Machine Learning in Python," J. Mach. Learn. Res., vol. 12 2016.
S. Walt, S. Colbert, and G. Varoquaux, "The NumPy Array: A structure for efficient numerical computation," Comput. Sci. Eng., vol. 13 2011.
J. Wilson, M. Charest, and R. Dubay, "Non-linear model predictive control schemes with application on a 2 link vertical robot manipulator," Robot. Comput.—Integr. Manuf., vol. 41 2016.
B. Li et al., "Large scale recurrent neural network GPU," Int. Joint Conf. Neural Netw 2014.
Lunga et al. "Manifold-Learning-Based Feature Extraction for Classification of Hyperspectral Data". 2014.
Taskin, G. and Crawford, M.M. "An out-of-sample extension to manifold learning via meta-moedling".

\* cited by examiner

METHODS AND SYSTEMS FOR REDUCING DIMENSIONALITY IN A REDUCTION AND PREDICTION FRAMEWORK

RELATED APPLICATIONS

This application claims the benefit of and priority to U.S. Provisional Patent Application No. 62/970,493, filed Feb. 5, 2020, entitled "METHODS AND SYSTEMS FOR REDUCING DIMENSIONALITY IN A REDUCTION AND PREDICTION FRAMEWORK", the contents of which are incorporated herein by reference.

FIELD

This disclosure relates generally to artificial neural networks (ANNs). More particularly, the present application relates to methods and systems for reducing dimensionality.

BACKGROUND

There have been many recent developments in the use of statistical analytics and artificial intelligence to analyze large amounts of data to identify and characterize inherent relationships present in multi-dimensional vector spaces. However, as the number of dimensions grows with the complexity of captured data, conventional statistical analytics fail.

In the context of sensor data, and in particular image sensor data, machine learning algorithms are often trained on a database of acquired images that each have an inflated pixel space relative to the amount of useful information present in the pixel space. Training with high dimensionality data may be inefficient and time-consuming.

Manifold learning (ML) algorithms can be applied as an approach for non-linear dimensionality reduction. ML algorithms are typically based on the idea that the dimensionality of many data sets is artificially high.

Further development of more efficient ML algorithms and the application of such algorithms is desired.

SUMMARY

According to a first example aspect is a computer-implemented method that includes receiving a sensed data point from an industrial process; applying a mapping model to map the sensed data point to a respective embedding that has reduced dimensionality relative to the sensed data point; determining, based on a comparison of the respective embedding to prior embeddings, if the mapping model needs to be updated or not. When the mapping model needs to be updated, applying manifold learning to learn an updated set of model parameters for the mapping model. When the mapping model does not need to be updated, applying a classification model to the respective embedding to predict a classification for the sensed datapoint.

According to a further example aspect is a data processing system comprising one or more processors and one or more non-transitory storage mediums storing software instructions, that, when executed by the one or more processors cause the data processing system to perform a method comprising:
receiving a sensed data point from an industrial process;
applying a mapping model to map the sensed data point to a respective embedding that has reduced dimensionality relative to the sensed data point; determining, based on a comparison of the respective embedding to prior embeddings, if the mapping model needs to be updated or not: when the mapping model needs to be updated, applying manifold learning to learn an updated set of model parameters for the mapping model; and when the mapping model does not need to be updated, applying a classification model to the respective embedding to predict a classification for the sensed data point.

According to a further example aspect is a method that includes determining if a mapping model is accurate for mapping out-of-sample (OoS) data points to respective embeddings. If the mapping model is determined to be accurate, the mapping model used to map the OoS data points to the respective embeddings and a classification model is used to map the embeddings to a classification prediction. If the mapping model is determined not to be accurate: new mapping model parameters are determined for the mapping model using manifold learning; new classifier model parameters are determined for the classifier model; and the mapping model is used with the updated mapping model parameters to map the OoS data points to new respective embeddings and the classification model is used with the updated classifier model parameters to map the new respective embeddings to a classification prediction.

The present disclosure provides methods and systems for learning an existing manifold learning mapping function, which in turn is used to generate an out-of-sample mapping generator for (OoS) data points. If the existing mapping function is determined to be accurate, using the existing mapping function to map the OoS data points is used. If the existing function is determined not to be accurate: training a first ANN to learn an ML dimensionality reduction function using the OoS data points included with the original dataset; training a second ANN to learn a mapping of reduced dimensionality data output by the first ANN to a prediction.

BRIEF DESCRIPTION OF THE DRAWINGS

Reference will now be made, by way of example, to the accompanying drawings which show example embodiments of the present application, and in which.

Similar reference numerals may have been used in different FIGURES to denote similar components.

DESCRIPTION OF EXAMPLE EMBODIMENTS

The present disclosure relates to manifold learning (ML) and the use of ML methods to reduce the inherent dimension of a high dimensionality problem down so that reduced dimensionality data can be applied to applications such as system identification (SI) routines or to model-based control (MBC) applications. A nonlinear gain extraction unit (NGEU) described in the present disclosure may in some examples be used to derive a control law, so that a plant process can be automated to run a particular task.

In example embodiments, the methods and systems presented in the present disclosure connect current artificial intelligence (AI) tools to enable a calculation intensive ML function to be trained offline using an artificial neural network (ANN). When the trained function is then implemented online, the time intensive processes have already been completed.

In example embodiments, the NGEU described herein is implemented using an ANN trained to extract nonlinear gain from a reduced system dataset.

To provide context, information is presented in the following section "Complex Data and Control Models", regarding dimensionality for engineering systems.

Complex Data and Control Models

When nonlinear systems are encountered in a research problem, obtaining an accurate systems model of parameters from time-series (TS) datasets with linear statistical methods can prove to be very difficult depending on the dimension of the system. Conventional methodologies may fail to find the hidden structures that could be present (such as discontinuities). Advanced algorithms to uncover complex relationships may work to a point, but as the problem increases in dimension, (e.g., adding more sensors to plant machines or predicting geographic regional weather patterns) so does the effort in processing time and finding anything of relevance. This is known as the curse of dimensionality (CoD). Currently, nonlinear analysis and system parameter approximation is an active area of research toward addressing the issue of CoD.

In terms of MBC's, SI plays a very important role. One MBC scheme termed generalized predictive control (GPC) uses a model structure called CARIMA as described in [E. Camacho and C. Bordons, Model Predictive Control, 2nd ed. Berlin, Germany: Springer, 2007]. If this controller is to perform well, it needs data that can be interpreted correctly and processed as fast as possible. Processing the multitudes of data that are acquired/stored in real-time is relevant if the above structure is to predict correct output values in a timely fashion. This is key in today's industrial trends toward autonomous plants (see for example, [S. Zhang, R. Dubay, and M. Charest, "A principal component analysis model-based predictive controller for controlling part warpage in plastic injection molding," Expert Syst. Appl., Int. J., vol. 42, no. 6, pp. 2919-2927, 2015]).

As will be described in greater detail below, the NGEU described herein is trained offline, and runs online to predict the next set of parameters in a timely fashion. The NGEU approximates ML mapping calculations and nonlinear gain predictions, which in turn can then be used in MBC's to formulate a control law.

Manifold Learning and Dimension Reduction

Among other things, the methods and systems disclosed herein are applicable for applications that require geometric analysis of data, including for example ML applications such as machine learning, image processing, and computer vision.

Out-of-Sample Mapping

Figure 1:
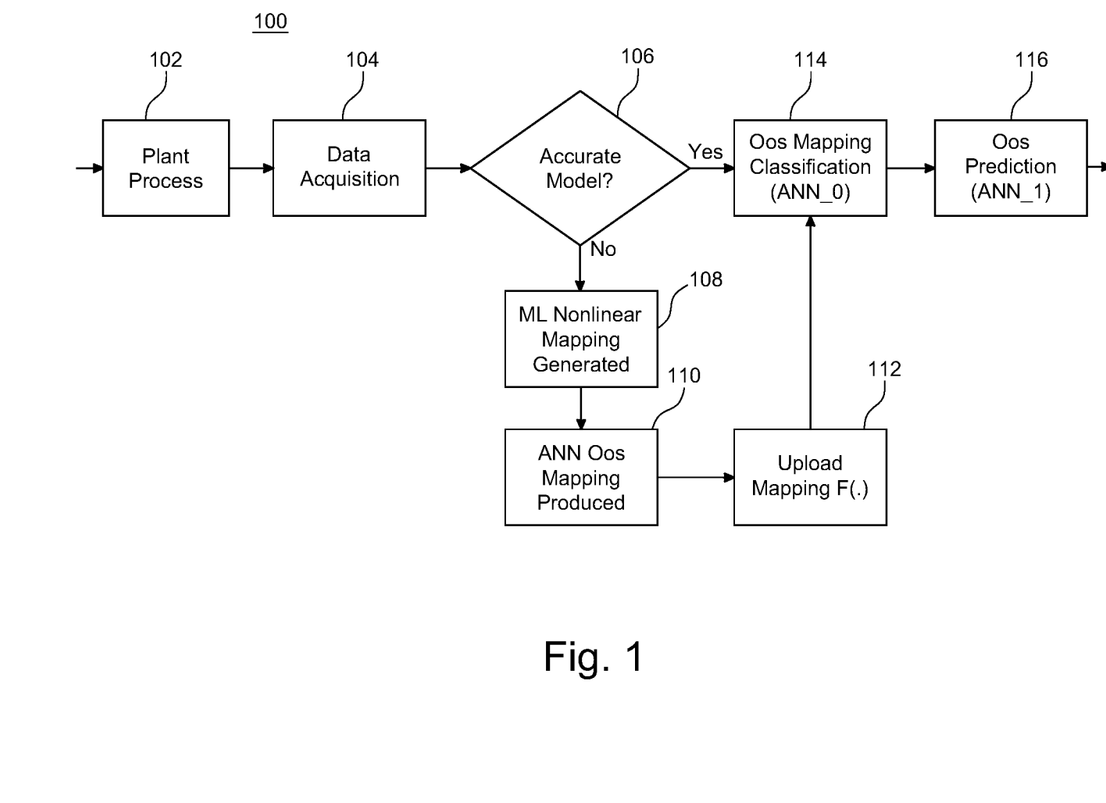
FIG. 1 is a flow chart illustrating an out-of-sample (OoS) mapping ANN that approximates a nonlinear mapping function produced by a manifold learning (ML) algorithm.

FIG. 1 illustrates an example of a process flow 100 for an out-of-sample (OoS) extension module that may be used to implement a NGEU. OoS data refers to new data not included in a prior training set. An ANN out-of-sample (OoS) mapping model (e.g., ANN_0) produced by an ML algorithm is used to approximate a nonlinear mapping function $\mathcal{F}(\cdot)$. Mapping model ANN_0 is configured by a set of mapping model parameters that have been learned using the ML algorithm. As a result of an OoS extension process shown in FIG. 1, the ML algorithm does not need to be run on a continuous basis. In an online application, where new OoS data is gathered continuously, running an ML algorithm at discrete intervals (e.g., every $\Delta t$) may not be possible when an accurate systems model is needed for an output prediction or when nonlinear gains need to be extracted for a control law. As more data is collected, the longer each new ML algorithm iteration takes. Therefore, extension training an ANN OoS mapping on an as-needed-basis, rather than a discrete interval ($\Delta t$) basis, may be beneficial in many applications.

In this regard, the process flow 100 for a first stage OoS extension according to an example embodiment can be seen in FIG. 1. A plant process 102 (for example an industrial process such as a manufacturing process) generates data that the plant sensors read (Data Acquisition 104) and send to a processing system for analysis. The processing system is configured to make a decision (Decision Block 106: "Accurate model?") as to whether the ML algorithm needs to be rerun to produce a new ANN OoS mapping approximation or model (e.g., ANN_0) of nonlinear mapping function [$\mathcal{F}(\cdot)$] or if an existing model (e.g., existing ANN_0) of mapping function [$\mathcal{F}(\cdot)$] produced in previous time instances can be used. If the existing model is deemed not to be an accurate model, as, indicated by the "no" path in FIG. 1, the ML algorithm is run (Block 108: "ML Nonlinear Mapping Generated") to produce a new ANN OoS mapping (e.g., new ANN_0) (Block 110: "ANN Oos Mapping Produced" to approximate a new mapping function [$\mathcal{F}(\cdot)$]. The new ANN OoS model approximation of new mapping function [$\mathcal{F}(\cdot)$] is then applied (Block 112 "Upload Mapping F($\cdot$)"), in conjunction with a classification function (e.g., ANN_1) to classify the acquired sensed data (Block 114:"OoS Mapping/Classification") to infer predictions (Block 116: "OoS Prediction). Classification model ANN_1 is configured by a set of learned classification model parameters that have been learned using a classifier training algorithm.

In the case where the existing ANN OoS model (e.g., existing ANN_0) is deemed to be an accurate model, as indicated by the "yes" path in FIG. 1, the ML algorithm is not rerun. Instead, the existing ANN OoS model approximation (e.g., existing ANN_0 approximation of mapping function [$\mathcal{F}(\cdot)$]) is applied with ANN classification model (e.g., ANN_1) to classify the acquired sensed data (Block 114:"OoS Mapping/Classification") to infer predictions (Block 116: "OoS Prediction").

Thus, if the existing ANN OoS model (ANN_0) enables accurate predictions on the new data, no model update is required, but if the existing ANN OoS model is not making accurate predictions, the ML algorithm is rerun on new data.

Manifold Learning

In an illustrative example embodiment, the applied ML algorithm used to train ANN_0 is derived from ISOMAP (isometric feature mapping), as discussed in [J. Tenenbaum, V. Silva, and J. Langford, "A global geometric framework for non-linear dimensionality reduction," Science, vol. 290, pp. 2319-2322, 2000], and local linear embedding (LLE), see [S. Roweis and L. Saul, "Non-linear dimensionality reduction by local linear embedding," Science, vol. 290, pp. 2323-2326, 2000].

Non-limiting examples of other possible ML algorithms or routines for implementing ANN_0 are Laplacian eigenmaps, Hessian eigenmaps, and local tangent space alignment, which are all extensions of ISOMAP and LLE. In an illustrative embodiment, ISOMAP is used as the primary ML algorithm, as ISOMAP has been demonstrated to function in the context of curved and twisted surfaces and have the ability to unroll convex graphs.

Vertical Link Manipulator

For illustrative purposes, example embodiments are a described in the context of a two-link manipulator simulation test environment. A two-link manipulator is used as the platform for an OoS extension module. A first ANN block (ANN_0) is used to map new points to a lower dimensional space (d). Then, those results are used to train another ANN block (ANN_1) to extract nonlinear gains from the ML data and complete the NGEU as a whole. A basic diagram of an example of a two-link, 2 angle joint ($\theta_1$, $\theta_2$) manipulator can be seen [J. Wilson, M. Charest, and R. Dubay, "Non-linear model predictive control schemes with application on a 2 link vertical robot manipulator," Robot. Comput.-Integr. Manuf., vol. 41, pp. 23-30, 2016].

Neural Networks

Figure 2:
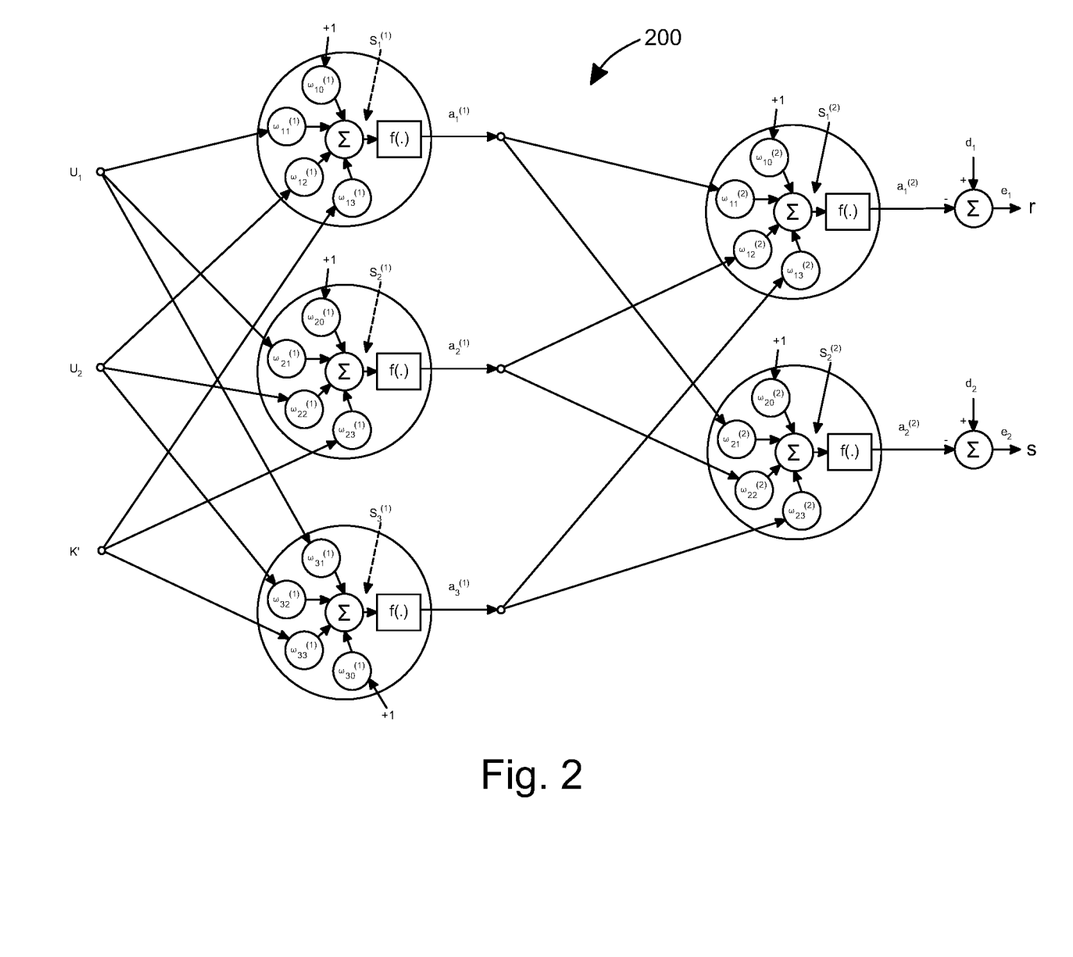
FIG. 2 is a schematic diagram of an artificial neural network (ANN) in accordance with an example embodiment.

In example embodiment, a first ANN (OoS ANN or ANN_0) is trained to learn the ML algorithm and a second ANN (Non-linear Gain Extraction or ANN_1) is trained to learn the nonlinear gain predictions. FIG. 2 shows an example basic diagram of ANN structure 200 used for the first ANN (OoS ANN) that learns the ML mapping calculations. As presented in FIG. 2, the variables ($U_1$, $U_2$) correspond to the input voltages to the two-link manipulator detailed in "Vertical Link Manipulator." The third input variable is (K'), the normalized gain value reached after all transient behaviors become negligible. The two outputs of the ANN structure of FIG. 2 represents the new intermediate global coordinate system (r, s), generated from ISOMAP on the two-link manipulator.

The first and second ANNs (ANN_0, ANN_1) are constructed with a variable hidden layer. In alternative embodiments, different ANN structures can be used. In general, an ANN structure is chosen by a designer based on problem dependent specifics. Each different design of ANN differs in internal connections. For example, recurrent neural networks have internal memory, self-feedback connections, and time delay blocks.

In some examples, first and second ANNs may be implemented using different sets of layers within a larger ANN.

Nonlinear Gain Extraction Unit-NGEU

Figure 3:
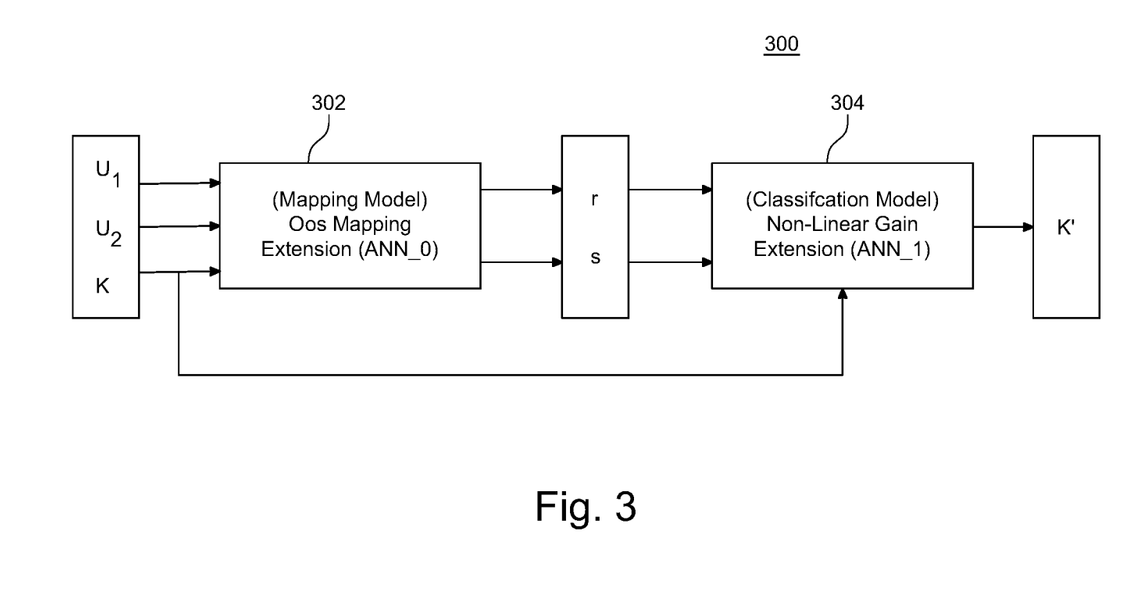
FIG. 3 is a flow chart illustrating operations of blocks in the ANN of FIG. 3.

FIG. 3 illustrates a block diagram of an NGEU 300 according to an example embodiment, including OoS extension (Block 302: OoS ANN or ANN_0) and non-linear gain prediction (Block 304: Non-linear Gain Extraction or ANN_1). In some example embodiments, the NGEU structure may be scaled to include inputs/outputs for other sensing and control options (for example for $\theta_2$ of the two-link manipulator, which is not shown in FIG. 3).

The operation is as follows, inputs ($U_1$, $U_2$, K (e.g., $\theta_1^{ss}$)) are the inputs to the OoS ANN (ANN_0). The OoS ANN target variables are the mapping coordinates calculated from the ML ISOMAP routine. Once the OoS ANN (ANN_0) is trained, it can now accept data points from outside the original dataset. Lastly, these mapped coordinates (r, s) are then used as inputs to Non-linear Gain Extraction ANN (ANN_1) where the target variable is the steady-state gain (K').

Neural Network Training

In example embodiments, Oos ANN (ANN_0) can be trained using a normalized gain surface (K') generated from angular position data ($\theta_1^{ss}$) of a vertical two-link manipulator. The outputs of the OoS ANN (r, s), (ANN_0) can be used as inputs to train a similar structure (ANN_1) to complete the NGEU setup.

Randomly generated voltages ($U_1$, $U_2$) can be implemented until ($\theta_1\theta\theta_1^{ss}$). A plurality of tests can be used to construct a training and test dataset consisting of ($U_1$, $U_2$, $\theta_1^{ss}$). Finally, each ($\theta_{(1,i)}^{ss}$) can be normalized to extract the gain ($K_i'$) for corresponding values of ($U_{(1,i)}$, $U_{(2,i)}$), to provide two separate datasets for testing and training purposes.

In one simulation, from the (n=7500) trials that make up the dataset, (n=5835) elements existing in the region were used to train the OoS and NGEU ANN. New patterns were then sent through to test the mapping capabilities of the trained ANN's. Therefore, the training set {·} is denoted, as shown in the following relation (1):

$$TR \doteq \left\{ \left( \vec{U}_{(1,i)}, \vec{U}_{(2,i)}, \vec{K}'_{(i)} \right) \right\}_{i=1,2,\ldots,N_t'}. \tag{1}$$

Nonlinear Gain Extraction Unit (NGEU)

The goal is to extract nonlinear gain parameter(s) from the reduced datasets. With the results from "Output Mapping Results-Test Set" the simulated ML mapping (r, s) and the practical found ones as (r, s, t) were used to train a similar network structure to extract the nonlinear gain(s) from the lower dimensional space (d). This new block used the exact same ANN setup, as in FIG. 2. The only notable difference is that instead of two output nodes, there is now only one for the simulation setup ($K_1$) and two for the practical ($K_1$, $K_2$).

The systems and methods described herein can be applied to SI problems and control performances.

Image Data Applications

In the area of sensor fusion, the augmentation of images into a dataset turns the analysis for an industrial quality inspection into a highly nonlinear problem. The present disclosure provides examples that can be applied to independent machine learning tools that make augmentation of images computationally viable, which may help to solve the highly nonlinear problem.

In some examples, the present disclosure reduces the inflated pixel space of an image (ie., 1280*1024=1,310,720) from an artificially high representation to a low 2d or 3d coordinate mapping. A dataset is collected and ran through a Manifold Learning (ML) algorithm. With this reduction, a neural network is trained to learn the mapping function of the ML algorithm. This is termed an Out-of-sample (OoS) extension.

In some examples, the OoS exists in some research facets. The augmentation is another neural network (or other machine learning model structure) to make use of the reduced pixel space for an application such as industrial quality inspection. The secondary network trains on human labeled defects.

Figure 6:
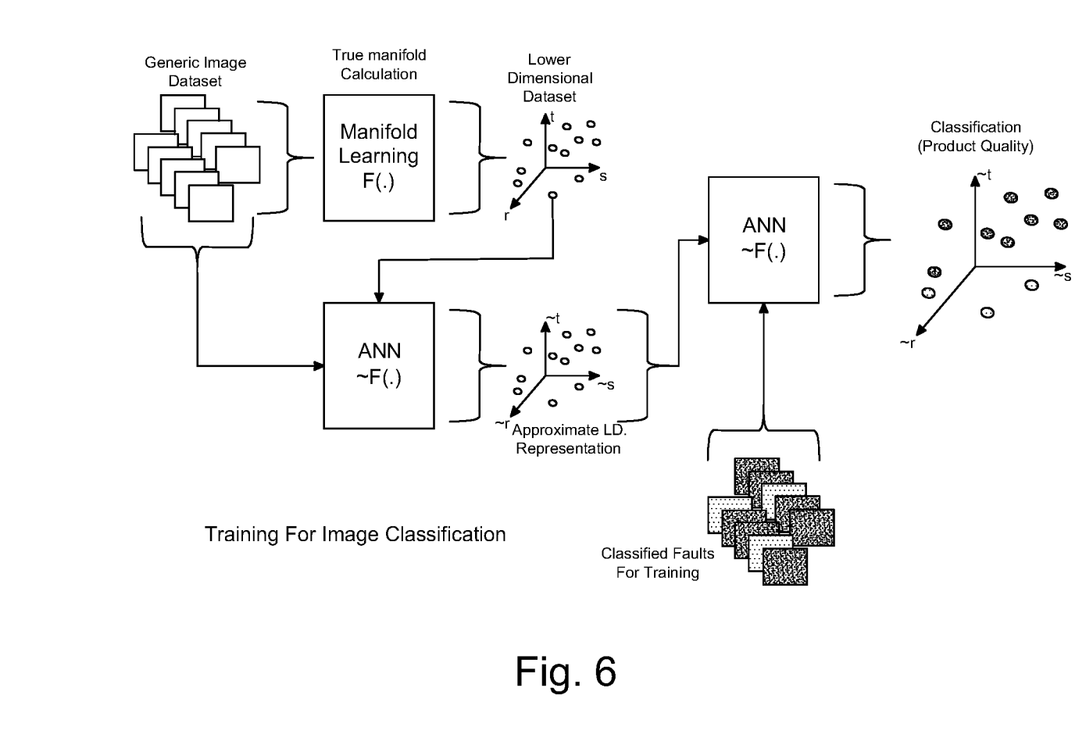
FIG. 6 illustrates model training for an image classification task.
Figure 7:
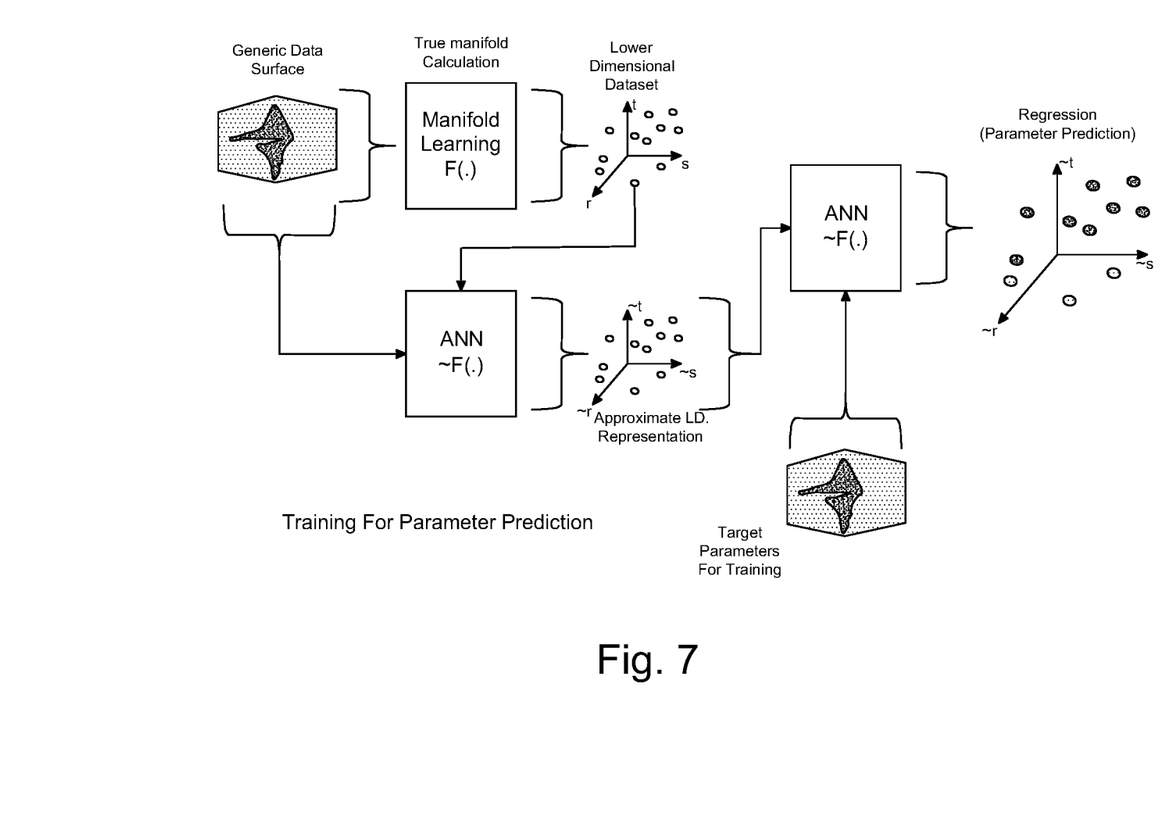
FIG. 7 illustrates model training for a parameter prediction task.

When both networks are trained, an image can now be presented to this reduction and prediction framework (RaPF) and a swift classification or model parameter prediction can now be made. The premise behind this structure is to be general enough to be used over various applications, whether it be image-based classification or parameter prediction. FIG. 6 illustrates model training for image classification; and FIG. 7 illustrates model training for parameter prediction training. The process starts with a training dataset of images or an arbitrary data surface like a nonlinear gain surface. From there, a lower dimensional mapping is found. This new data graph is then used as target variables for the first ANN_0. Once training is complete, this ANN acts as the nonlinear mapping [F(·)].

In some applications, the disclosed method to train the ANN may be adaptable to other applications other than industrial quality inspection. Moreover, there is no calculation intensive learning when a system is online. The online classification mapping calculation is close to real-time.

In some examples, a Manifold Learning (ML) algorithm is run first, and then training on a feature space of 2d to 3d can be performed in a time efficient manner, which may help to save time cost of training the prediction ANN significantly.

Figure 4:
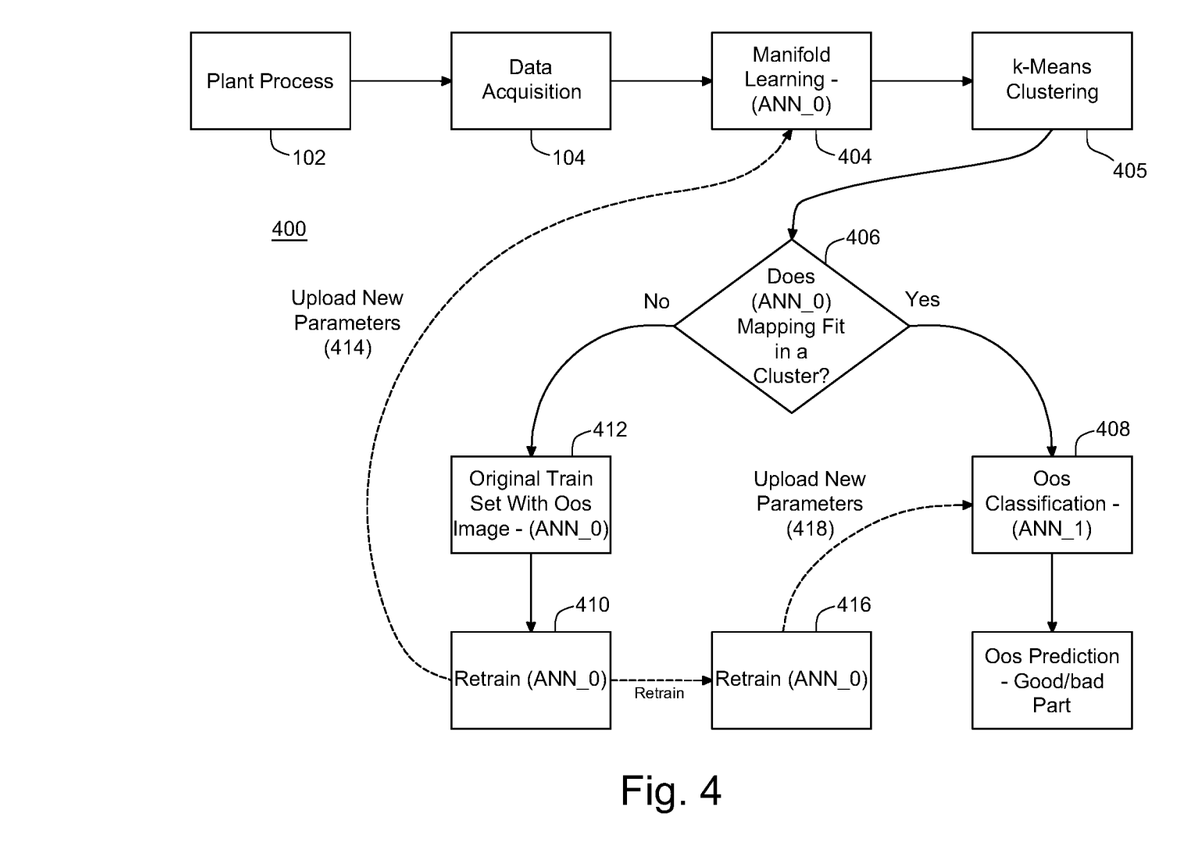
FIG. 4 is a further flow chart illustrating operations performed by an out-of-sample (OoS) mapping ANN that approximates a nonlinear mapping function produced by a manifold learning (ML) algorithm.

Reference is now made to the process 400 of FIG. 4, to summarize aspects of a representative embodiment that incorporates the features described above.

As described above in respect of FIG. 1, a plant process 102 generates data that is acquired by plant sensors (Data Acquisition operation 104). In an example embodiment, the plant process 102 is a part manufacturing process, the plant sensors includes an image capture device such as a camera 404, and the acquired data is image data that is processed to classify a manufactured part as a "Good" part or a "Bad" part. As known in the art, a time-series of image data comprises multiple frames of pixels, resulting in a large amount of high-dimensionality data to analyze.

Process 400 includes an ML based ANN operation 404 to process the high-dimensionality data acquired by data acquisition operation 104 and generate a respective reduced dimensionality dataset. In this regard, ANN operation 404 is performed using a first ANN (ANN_0) that has been pre-trained using ML with an original training dataset ($D_{train}$) to generate lower dimensionality feature vector embeddings to represent respective features of interest in the originally acquired high-dimensionality data.

During on-line operation of the process 400, the high dimensionality data that is processed by ML based ANN operation 404 will be new data that was not used during the ML training of ANN_0. Changes in the manufacturing process and the input materials over time may introduce variances into the newly acquired data that can render the embeddings generated by mapping ANN_0 obsolete. Accordingly, process 400 includes comparison operation 405 and decision operation 406 to determine if mapping ANN_0 continues to be an accurate embedding model. In example embodiments, as part of system training, a k-means clustering function is applied to the embeddings generated in respect of a training dataset to generate k clusters. During on-line processing, at operation 405, the embeddings generated from on-line acquired data are compared with the known k clusters to determine if the generated embeddings fall within the threshold boundaries of one of the known k clusters or are outliers. Based on this information, decision operation 406 can determine if the existing mapping ANN_0 model remains accurate. In some examples, a threshold number of outlying embeddings within a defined time period will cause decision operation 406 to conclude that the existing mapping ANN_0 model is no longer accurate ("No"), otherwise decision operation 406 will conclude that the existing mapping ANN_0 model continues to be accurate ("Yes"). By way of example, the threshold could be as low as one outlying embedding.

In the case of a "Yes" determination (i.e. mapping ANN_0 model continues to be accurate), the process 400 continues on-line. In particular, the embeddings generated by existing mapping ANN_0 model will be provided to a classifier ANN_1 model, as indicated by operation 408. Classifier ANN_1 model is a pre-trained model that has been trained using a labelled training set ($D_{Labeled}$) to predict a classification. For example, in the case of a manufactured part, the classification may be a quality control rating such as "Good Part" or "Bad Part". Labelled training set ($D_{Labeled}$) may be derived from a labelled subset of the original training dataset ($D_{train}$), for example.

A "No" determination by decision operation 406 causes process 400 to perform off-line retraining of an off-line mapping ANN_0 model as indicated by operation 410. In example embodiments, the acquired data sample(s) (for example, a captured image) associated with the outlier embedding(s) are added into the original training dataset ($D_{train}$) (operation 412). The modified training dataset original training dataset ($D_{train}$) is then applied by an ML algorithm to retain mapping ANN_0 model, and more particularly learn a new set of parameters for the mapping ANN_0 model. The new parameters are then uploaded and applied to an on-line mapping ANN_0 model, as indicated by dashed line 414.

In some examples, classifier ANN_1 models may also be retrained, as indicated by operation 416. For example, embeddings the labeled training dataset ($D_{Labeled}$) can be generated using the retrained mapping ANN_0 model, and then those new embeddings and the associated labels used to retain an offline classifier ANN_1 model, more particularly learn a new set of parameters for the classifier ANN_1 model. The new parameters are then uploaded and applied to an on-line classifier ANN_1 model, as indicated by dashed line 418.

Once the on-line ANN models are updated, process 400 can be brought back on-line. The acquired data associated with the previously outlying embeddings can be re-processed by the updated mapping ANN_0 and classifier ANN_1 modes.

Accordingly, it will be appreciated that the embodiments described above provide a system that enables dimensionality to be reduced using an ML trained mapping ANN. This enables a less-computationally intensive classifier ANN model to be used.

In example embodiments, the off-line mapping model and off-line classifier model may be hosted on different computing systems than the on-line models. In some examples, the industrial process that corresponds to plant process 1002 may continue running and using the existing mapping and classification models while the models are being updated off-line.

Figure 5:
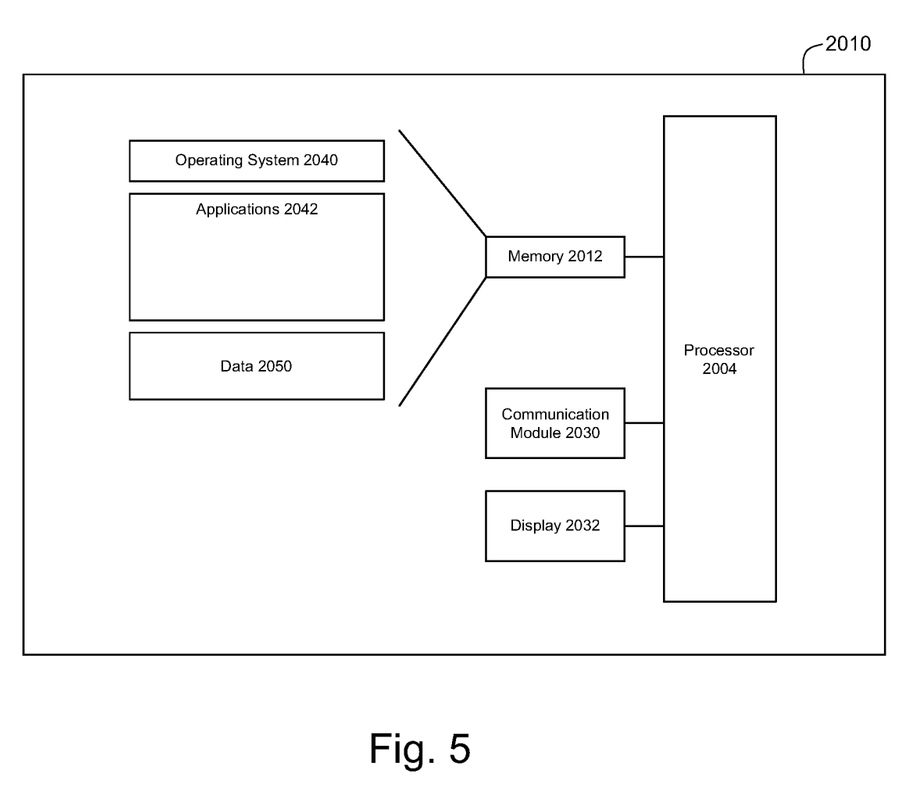
FIG. 5 is a block diagram of a computing device that may be used to implement aspects of the present disclosure.

Referring to FIG. 5, an example embodiment of a computer system 2010 for implementing one or more of the modules, systems and agents described above, including one or both of mapping ANN, classifier ANN, and the other operational modules described above. In example embodiments, computer system 2010 may be a computer server. The system 2010 comprises at least one processor 2004 which controls the overall operation of the system 2010. The processor 2004 is coupled to a plurality of components via a communication bus (not shown) which provides a communication path between the components and the processor 2004. The system comprises memories 2012 that can include Random Access Memory (RAM), Read Only Memory (ROM), a persistent (non-volatile) memory which may one or more of a magnetic hard drive, flash erasable programmable read only memory (EPROM) ("flash memory") or other suitable form of memory. The system 2010 includes a communication module 2030. The communication module 2030 may comprise any combination of a long-range wireless communication module, a short-range wireless communication module, or a wired communication module (e.g., Ethernet or the like) to facilitate communication through a communication network. Operating system software 2040 executed by the processor 2004 may be stored in the persistent memory of memories 2012. A number of applications 2042 executed by the processor 2004 are also stored in the persistent memory. The applications 2042 can include software instructions for implementing the systems, methods, agents and modules described above.

Although the present disclosure describes methods and processes with steps in a certain order, one or more steps of the methods and processes may be omitted or altered as appropriate. One or more steps may take place in an order other than that in which they are described, as appropriate.

Although the present disclosure is described, at least in part, in terms of methods, a person of ordinary skill in the art will understand that the present disclosure is also directed to the various components for performing at least some of the aspects and features of the described methods, be it by way of hardware components, software or any combination of the two. Accordingly, the technical solution of the present disclosure may be embodied in the form of a software product. A suitable software product may be stored in a pre-recorded storage device or other similar non-volatile or non-transitory computer readable medium, including DVDs, CD-ROMs, USB flash disk, a removable hard disk, or other storage media, for example. The software product includes instructions tangibly stored thereon that enable a processing device (e.g., a personal computer, a server, or a network device) to execute examples of the methods disclosed herein.

The present disclosure may be embodied in other specific forms without departing from the subject matter of the claims. The described example embodiments are to be considered in all respects as being only illustrative and not restrictive. Selected features from one or more of the above-described embodiments may be combined to create alternative embodiments not explicitly described, features suitable for such combinations being understood within the scope of this disclosure.

All values and sub-ranges within disclosed ranges are also disclosed. Also, although the systems, devices and processes disclosed and shown herein may comprise a specific number of elements/components, the systems, devices and assemblies could be modified to include additional or fewer of such elements/components. For example, although any of the elements/components disclosed may be referenced as being singular, the embodiments disclosed herein could be modified to include a plurality of such elements/components. The subject matter described herein intends to cover and embrace all suitable changes in technology.

The content of all published papers identified in this disclosure are incorporated herein by reference.

The invention claimed is:

1. A computer implemented method comprising:
   receiving a sensed data point from an industrial process;
   applying a mapping model to map the sensed data point to a respective embedding that has reduced dimensionality relative to the sensed data point;
   determining, based on a comparison of the respective embedding to prior embeddings, if the mapping model needs to be updated or not:
   when the mapping model needs to be updated, applying manifold learning to learn an updated set of model parameters for the mapping model; and
   when the mapping model does not need to be updated, applying a classification model to the respective embedding to predict a classification for the sensed data point.

2. The computer implemented method of claim 1 wherein the method further comprises:
   when the mapping model needs to be updated: updating the classification model based on embeddings generated based on the updated set of model parameters.

3. The computer implemented model of claim 2 wherein the method further comprises:
   when the mapping model needs to be updated: following updating of the mapping model and the classification model, applying the updated mapping model to map the sensed data point to a respective updated embedding, and applying the updated classification model to the respective updated embedding to predict a classification for the sensed data point.

4. The method of claim 1 wherein applying manifold learning to learn the updated set of model parameters is performed off-line relative to the industrial process and for the mapping model; and applying the classification model to predict the classification for the sensed data point is performed on-line relative to the industrial process.

5. The method of claim 1 wherein the sensed data point comprises image data.

6. The method of claim 5 wherein the classification model is configured to predict a classification as to the quality of an output product of the industrial process based on image data that captures a representation of the output product.

7. The method of claim 1 wherein determining if the mapping model needs to be updated or not comprises determining if the respective embedding falls within one of k-clusters generated using a k-means clustering algorithm in respect of a training dataset.

8. A data processing system comprising one or more processors and one or more non-transitory storage mediums storing software instructions, that, when executed by the one or more processors cause the data processing system to perform a method comprising:
   receiving a sensed data point from an industrial process;
   applying a mapping model to map the sensed data point to a respective embedding that has reduced dimensionality relative to the sensed data point;
   determining, based on a comparison of the respective embedding to prior embeddings, if the mapping model needs to be updated or not:
   when the mapping model needs to be updated, applying manifold learning to learn an updated set of model parameters for the mapping model; and
   when the mapping model does not need to be updated, applying a classification model to the respective embedding to predict a classification for the sensed data point.

9. The data processing system of claim 8 wherein the method further comprises:
   when the mapping model needs to be updated: updating the classification model based on embeddings generated based on the updated set of model parameters.

10. The data processing system of claim 9 wherein the method further comprises:

when the mapping model needs to be updated: following updating of the mapping model and the classification model, applying the updated mapping model to map the sensed data point to a respective updated embedding, and applying the updated classification model to the respective updated embedding to predict a classification for the sensed data point.

11. The data processing system of claim 8 wherein applying manifold learning to learn the updated set of model parameters is performed off-line relative to the industrial process and for the mapping model; and applying the classification model to predict the classification for the sensed data point is performed on-line relative to the industrial process.

12. The data processing system of claim 8 wherein the sensed data point comprises image data.

13. The data processing system of claim 12 wherein the classification model is configured to predict a classification as to the quality of an output product of the industrial process based on image data that captures a representation of the output product.

14. The data processing system of claim 8 wherein determining if the mapping model needs to be updated or not comprises determining if the respective embedding falls within one of the k-clusters generated using a k-means clustering algorithm in respect of a training dataset.

15. A method comprising:
  determining if a mapping model is accurate for mapping out-of-sample (OoS) data points to respective embeddings;
  if the mapping model is determined to be accurate, using the mapping model to map the OoS data points to the respective embeddings and a second model to map the embeddings to a prediction; and
  if the mapping model is determined not to be accurate:
    determining new mapping model parameters for the mapping model using manifold learning;
    determining new second model parameters for the second model;
    using the mapping model with the updated mapping model parameters to map the OoS data points to new respective embeddings and using the second model with the updated second model parameters to map the new respective embeddings to a prediction.

16. The method of claim 15 wherein the second model generates an image classification.

17. The method of claim 16 wherein the second model generates a parameter prediction for an industrial process.

* * * * *